J. E. TRAVIS.
Wheel Plow.
No. 52,651.
Patented Feb. 13, 1866.
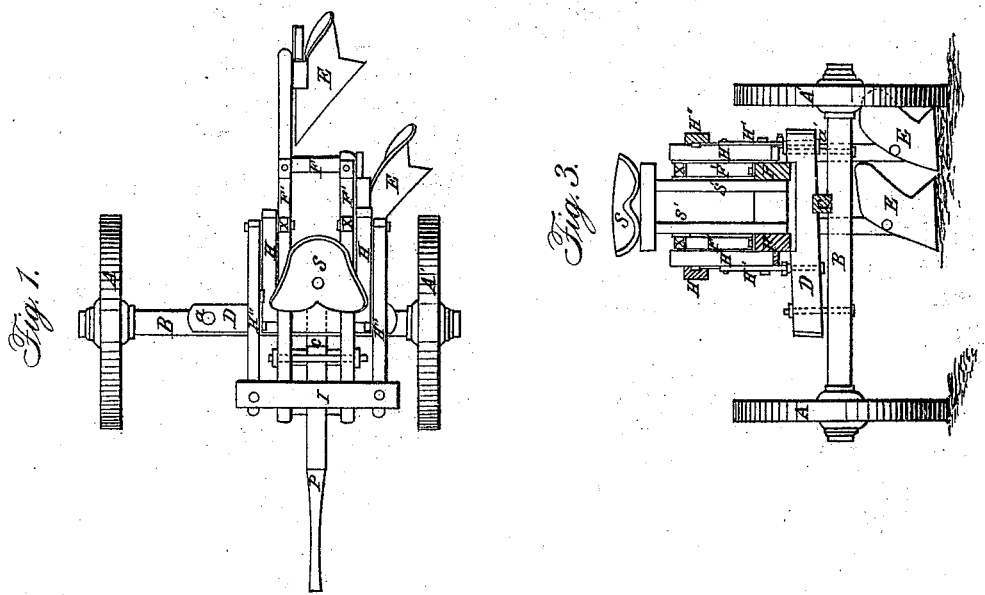
Witnesses:
B. F. Shaw
George L. ......
Inventor:
John E Travis
per M Randolph & Co
his Attys.

UNITED STATES PATENT OFFICE.

JOHN E. TRAVIS, OF GREENVILLE, ILLINOIS, ASSIGNOR TO HIMSELF AND ELON FRANCISCO, OF SAME PLACE.

IMPROVEMENT IN GANG-PLOWS.

Specification forming part of Letters Patent No. 52,651, dated February 13, 1866; antedated February 5, 1866.

*To all whom it may concern:*

Be it known that I, JOHN E. TRAVIS, of the town of Greenville, in the county of Bond and State of Illinois, have invented certain new and useful Improvements in Gang-Plows; and I hereby declare that the following is a full, clear, and exact description thereof, reference being had to the accompanying drawings, and the letters of reference marked thereon, and made to form part of this specification.

Of the annexed drawings, Figure 1 represents a plan of the improved plow. Fig. 2 is a side elevation, and Fig. 3 is a transverse section, of the same.

This invention relates, first, to the manner of attaching the head-block to the axle of said plow; secondly, to the manner of attaching the motive power, it being applied directly to frame which carries the plows, instead of to the axle, as has been the case with all plows of the kind heretofore; thirdly, this invention relates to the manner of mounting the plow-frame on the axle of the vehicle, and the method of raising said plow-frame in order to raise the plows up out of the ground.

To enable those skilled in the art to make and use my improved plow, I will proceed to describe its construction and operation.

As is customary with most gang-plows, I use the wheels A A' on the axle B, which parts, taken together, form the carriage, which is used for transporting the other portions of the plows and their connections. The sliding bar C is securely fastened to the top of the axle, and the bolster D is placed on top of the bar C, which enters a notch cut in the bottom side of the bolster for that purpose, but not sufficiently deep to bring the surfaces together, as there should be an inch or two of open space between them. The two screw-bolts a a' pass entirely through the axle and bolster and hold them firmly up on the intervening bar C. As it is intended that while the plows are in operation the wheel A will travel on the surface of the ground and the wheel A' in the furrow, it is obvious that the axle will then be in an inclined position. In order to make the bolster sit level on this inclined axle the sliding bar C is placed between them so as to leave an open space, as already described, and the bolt a is screwed up so as to bring the bolster level, after which the bolt a' may be screwed up tight, thus leveling the bolster. The frame F, to which the plows E E are attached, rests on the top of the bolster D when the plows are in operation, as is shown in Fig. 2. The pole P, to which the motive power is attached, is securely fastened to the forward end of the frame F, directly over the sliding bar C, which is embraced loosely within a staple projecting from the under side of the frame F.

The driver's seat S is fastened on the top of the frame S', which is erected on the top of the bolster D, the said frame also serving as a guide for the frame F, between the two longitudinal beams of which it is placed.

The two braces H are placed one on either side of the frame F, and are hinged to the bolster by means of the hinges H', and to the braced posts F' by the pivot x. The two levers H'' are securely fastened to the upper ends of the braces H, and are connected together by means of the foot-board I, which is within easy reach of the driver's feet. The braces H H are above and behind the bolster D, as is clearly shown in Fig. 2, and when the plows are down the angle of their inclination with the longitudinal axis of the frame F is about forty-five degrees. In this position they must necessarily push the axle and wheels ahead, as the motive power is attached to the frame F and transmitted, through it and the posts F' and the braces H H, to the axle and wheels.

In this construction it is obvious that as the frame F is drawn forward its tendency will be to push the braces H H upward, and itself with them; but this tendency is just overcome by the weight of the frame F and that of the parts attached to it, which combined weight is sufficient to keep the frame down and the plows in the ground.

When the operator wishes to raise the plows out of the ground he can press very slightly with his foot on the foot-board I, and the frame F will then push the braces H H up into a more vertical position, and so the frame and plows will be raised up in a very simple and easy manner, so easy that a small boy can operate a gang-plow, whereas, in those now in use it requires the best effort of a strong man. The best position of the plows is shown by the red lines in Fig. 2.

Having described my invention, what I claim is—

1. The sliding bar C, when used in connection with the axle B and bolster D and regulating-bolts $a$ $a'$, as and for the purpose set forth.

2. The hinged braces H H, the levers H'' H'', and posts F' F', for the purpose of attaching the plow-frame of gang-plows to the bolster thereof, when such parts are constructed and employed as described and set forth.

JOHN E. TRAVIS.

Witnesses:
    M. RANDOLPH,
    GEORGE P. HERTHEL, Jr.